(12) United States Patent
Kajiwara et al.

(10) Patent No.: US 10,930,963 B2
(45) Date of Patent: Feb. 23, 2021

(54) FUEL CELL STACK

(71) Applicant: TOYOTA JIDOSHA KABUSHIKI KAISHA, Toyota (JP)

(72) Inventors: Takashi Kajiwara, Gotemba (JP); Haruyuki Aono, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 145 days.

(21) Appl. No.: 16/251,860

(22) Filed: Jan. 18, 2019

(65) Prior Publication Data
US 2019/0288321 A1     Sep. 19, 2019

(30) Foreign Application Priority Data

Mar. 14, 2018    (JP) .............................. JP2018-047143

(51) Int. Cl.
*H01M 8/242*     (2016.01)
*H01M 8/0263*     (2016.01)
(Continued)

(52) U.S. Cl.
CPC ......... *H01M 8/242* (2013.01); *H01M 8/0258* (2013.01); *H01M 8/0263* (2013.01);
(Continued)

(58) Field of Classification Search
CPC ............. H01M 8/0254; H01M 8/0258; H01M 8/0263; H01M 8/0267; H01M 8/0271; H01M 8/0273; H01M 8/1004; H01M 8/1007; H01M 8/1018; H01M 8/2432; H01M 8/2483; H01M 8/0202;
(Continued)

(56) References Cited

U.S. PATENT DOCUMENTS

| 2009/0239129 A1 | 9/2009 | Seido et al. | |
| 2010/0196774 A1* | 8/2010 | Kawabata | H01M 8/0247 |
| | | | 429/437 |

(Continued)

FOREIGN PATENT DOCUMENTS

| JP | 2006-196426 | 7/2006 |
| JP | 2008-282589 | 11/2008 |

(Continued)

*Primary Examiner* — Gregg Cantelmo
(74) *Attorney, Agent, or Firm* — Finnegan, Henderson, Farabow, Garrett & Dunner, LLP

(57) ABSTRACT

A fuel cell stack in which unit cells are stacked, wherein the unit cell includes: a membrane electrode assembly; an insulating member; a first separator; a second separator; and a gasket, a hole penetrates through the insulating member and the first and second separators, the gasket extends around the hole on the insulating member, a flow path portion is formed in at least one of the first and second separators, the first and second separators define a communicating portion, one of the first and second separators includes: first and second protruding portions; and a recessed portion, at least a part of the communicating portion is defined by the first and second protruding portions, the recessed portion, and the other of the first and second separators, and the first separator includes a support portion contacting and supporting the insulating member on a back side of the gasket.

9 Claims, 10 Drawing Sheets

(51) Int. Cl.
*H01M 8/1004* (2016.01)
*H01M 8/2483* (2016.01)
*H01M 8/0267* (2016.01)
*H01M 8/0258* (2016.01)
*H01M 8/0271* (2016.01)
*H01M 8/0273* (2016.01)
*H01M 8/2432* (2016.01)
*H01M 8/0254* (2016.01)

(52) U.S. Cl.
CPC ....... *H01M 8/0267* (2013.01); *H01M 8/0271* (2013.01); *H01M 8/0273* (2013.01); *H01M 8/1004* (2013.01); *H01M 8/2432* (2016.02); *H01M 8/2483* (2016.02); *H01M 8/0254* (2013.01)

(58) Field of Classification Search
CPC ............. H01M 8/0247; H01M 8/0256; H01M 8/0276; H01M 8/026; H01M 8/0265; H01M 8/242
See application file for complete search history.

(56) References Cited

U.S. PATENT DOCUMENTS

2012/0156584 A1* 6/2012 Uehara ............... H01M 8/0273
429/465
2016/0380276 A1  12/2016 Ikoma

FOREIGN PATENT DOCUMENTS

| | | |
|---|---|---|
| JP | 2009-259780 | 11/2009 |
| JP | 2014-175237 | 9/2014 |
| JP | 2015-018676 | 1/2015 |
| JP | 2015-170406 | 9/2015 |

* cited by examiner

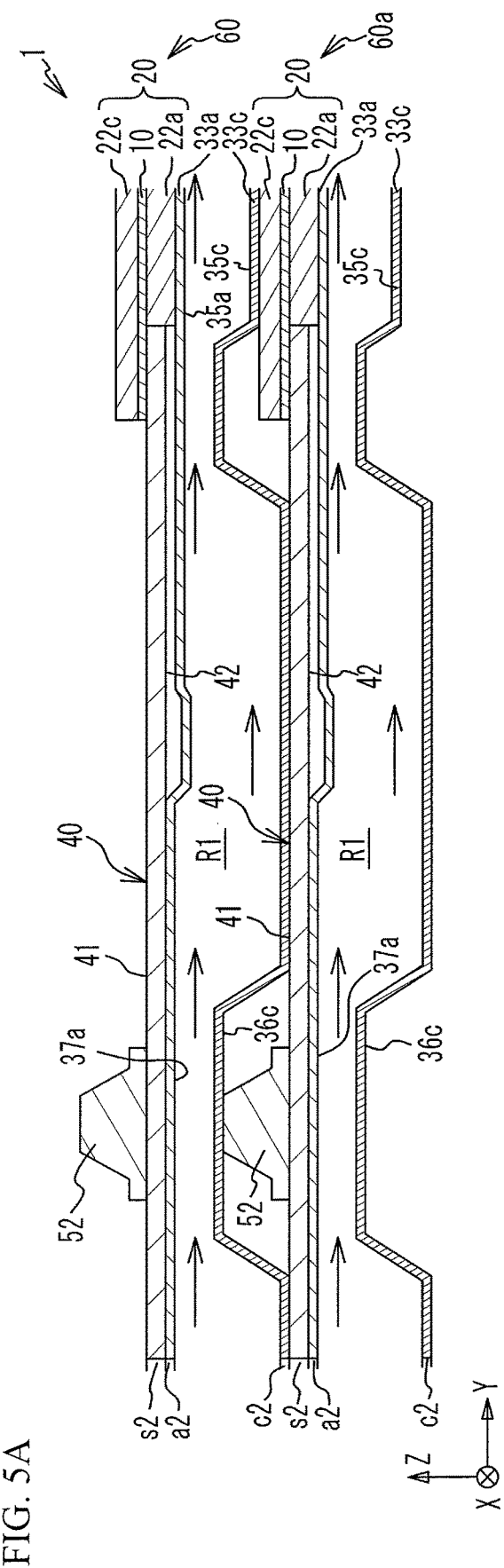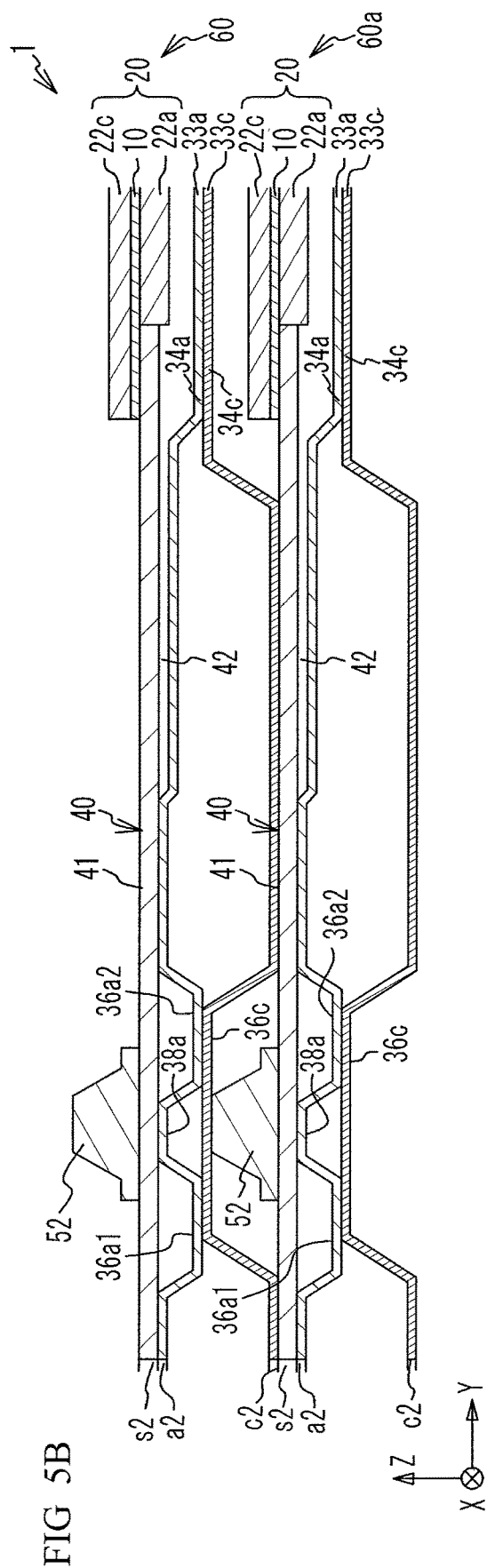

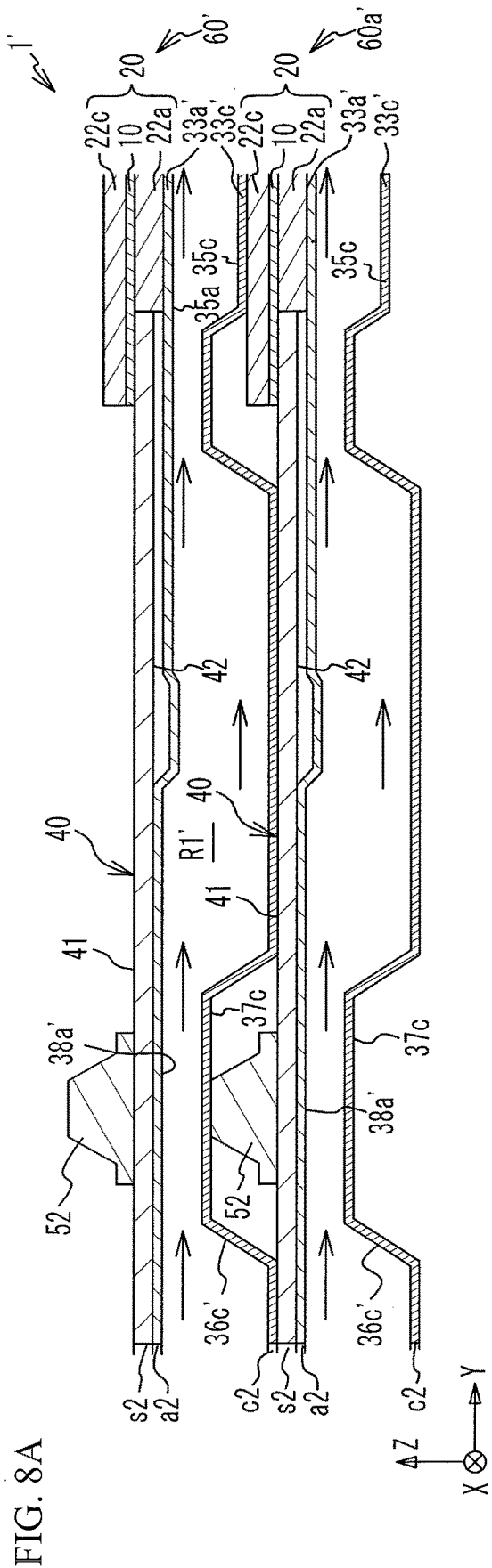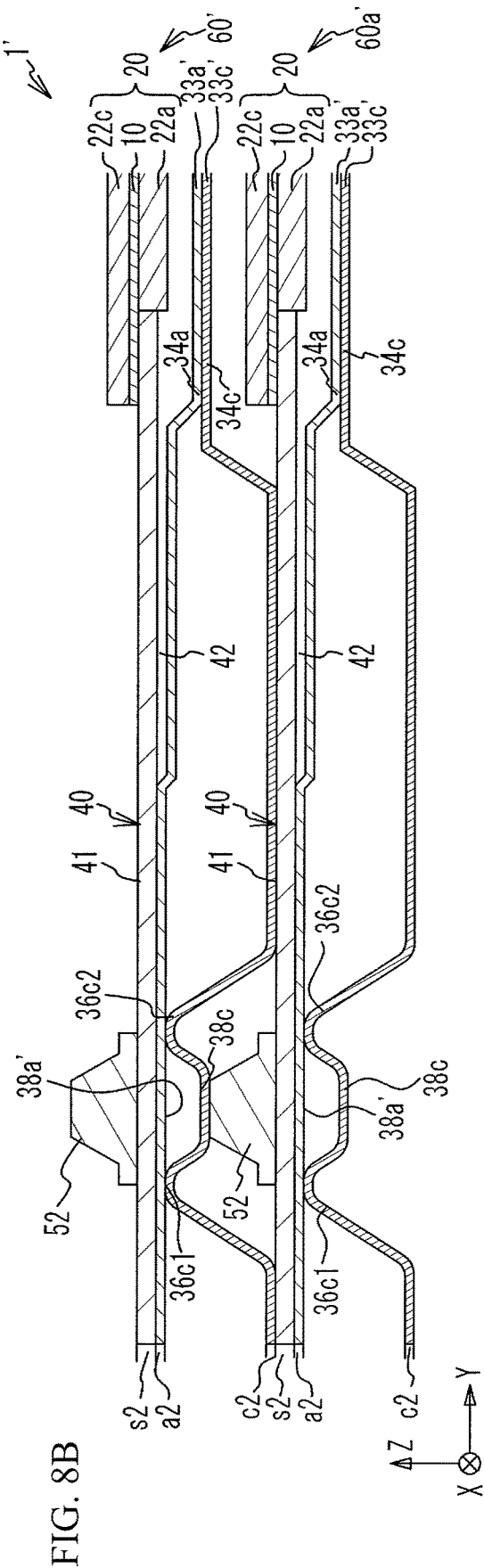
FIG. 8A
FIG. 8B

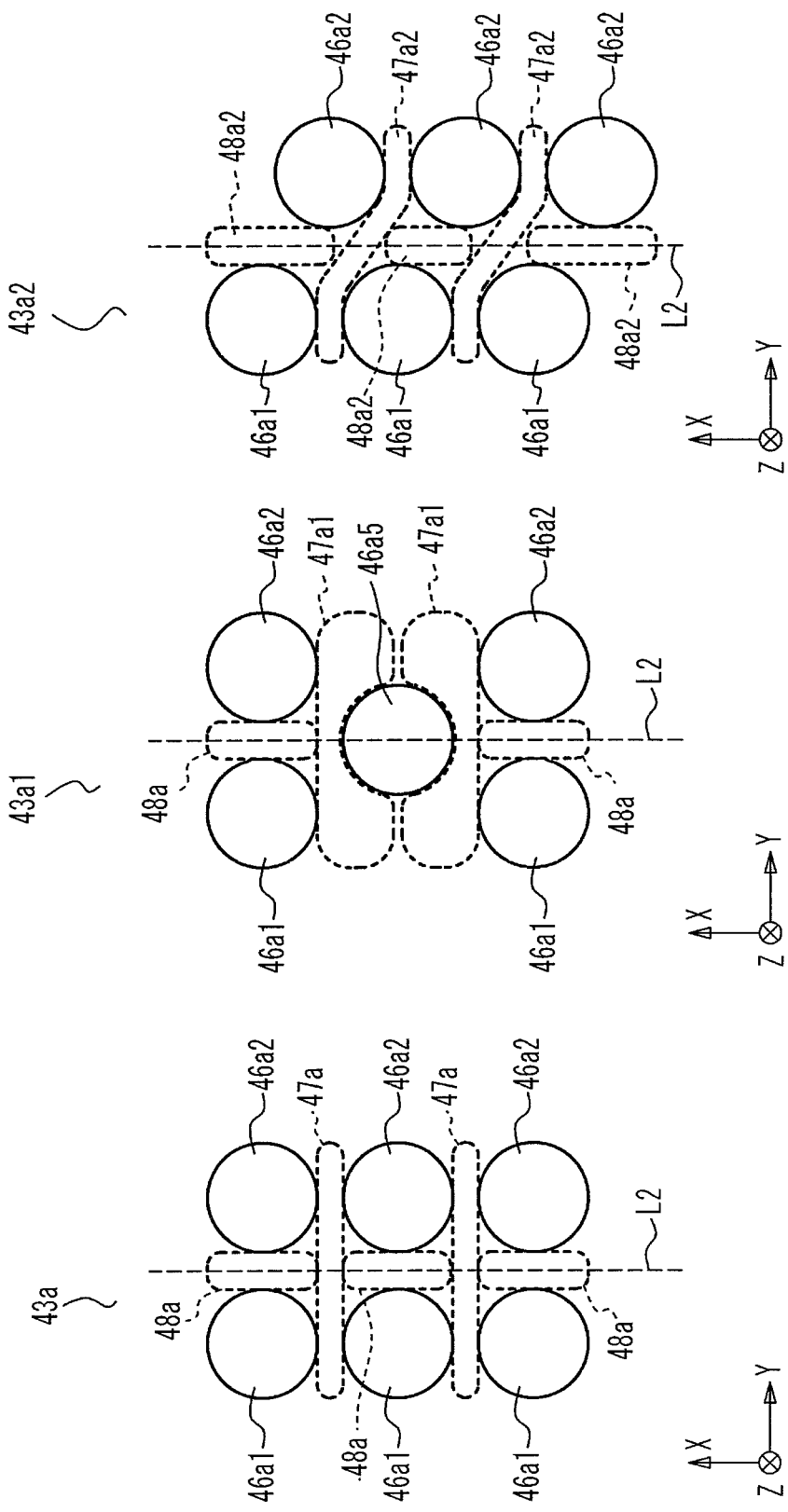

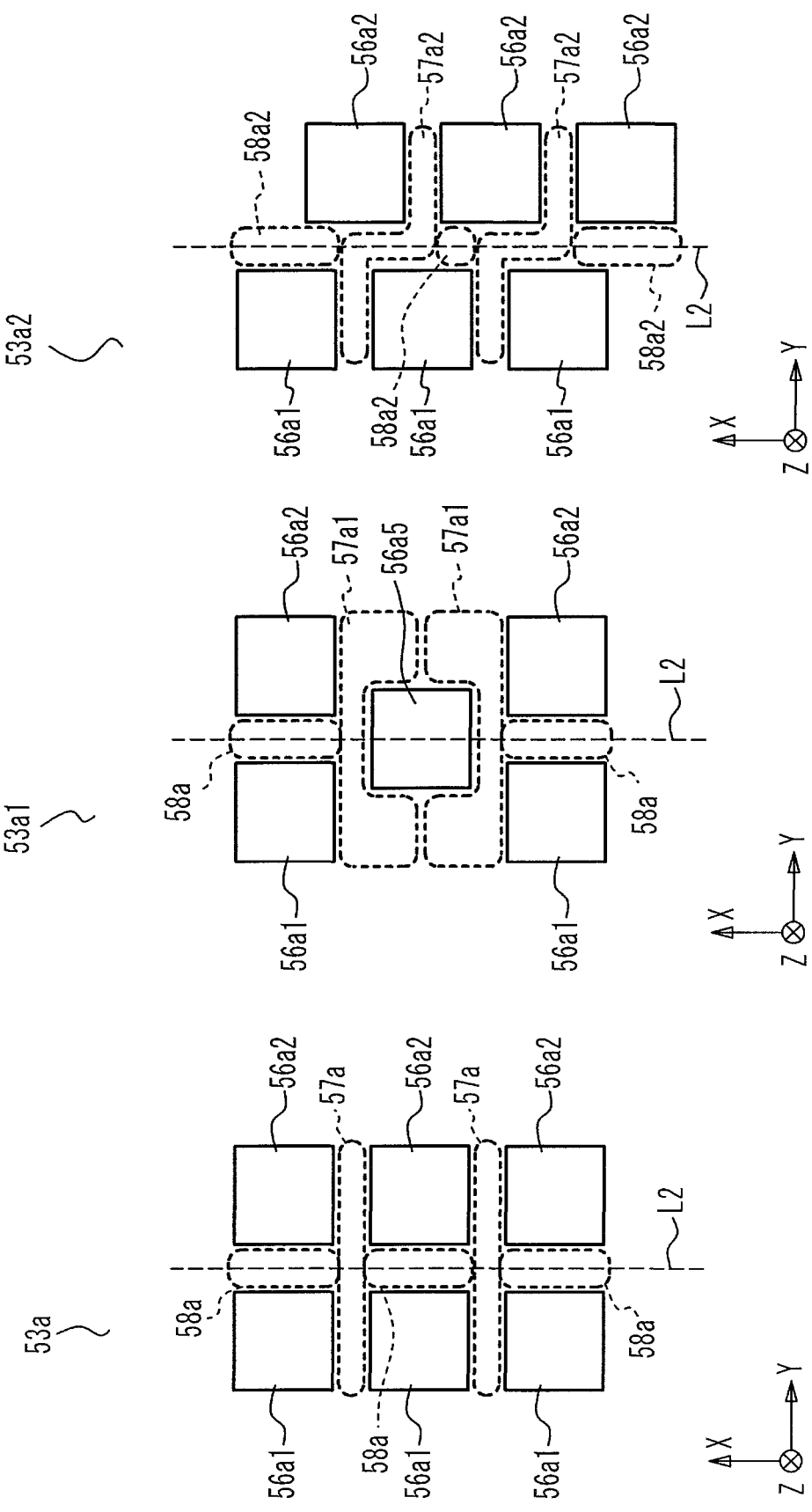

FUEL CELL STACK

CROSS-REFERENCE TO RELATED APPLICATION

This application is based upon and claims the benefit of priority of the prior Japanese Patent Application No. 2018-047143, filed on Mar. 14, 2018, the entire contents of which are incorporated herein by reference.

TECHNICAL FIELD

The present disclosure relates to a fuel cell stack.

BACKGROUND

A fuel cell stack in which unit cells are stacked is supplied with reactant gases to be used for power generation reaction and with a coolant for cooling. The unit cell is formed with holes through which the reactant gases and the coolant flow. The holes penetrate through the unit cell in a stacking direction. Each separator of the unit cells is formed with a flow path portion in a region facing a membrane electrode assembly, and a communicating portion for communicating the above-mentioned hole with the flow path portion. A gasket surrounding such a hole is provided between the stacked unit cells. The gasket is compressed in the stacking direction of the unit cells, and the reaction force of the compressed gasket ensures the sealing property.

Herein, the communicating portion formed in the separator described above extends so as to intersect a part of the gasket surrounding the hole. The communicating portion has a protruding and recessed shape such that a protruding portion and a recessed portion are arranged in the direction in which a part of the gasket extends. Such a communicating portion having a protruding and recessed shape intersects a part of the gasket, so that the communicating portion might not sufficiently receive the reaction force of the gasket. Thus, the gasket might not be sufficiently compressed, and the sealing property might be degraded. For example, in Japanese Unexamined Patent Application Publication No. 2006-196426, a dedicated member for receiving such reaction force of the gasket is provided separately from the separator.

However, if the dedicated member for receiving such reaction force of the gasket is provided, the number of parts might increase and the manufacturing cost might increase.

SUMMARY

It is an object of the present disclosure to provide a fuel cell stack that suppresses an increase in the number of parts and suppresses deterioration of the sealing property.

The above object is achieved by a fuel cell stack in which unit cells are stacked, wherein the unit cell includes: a membrane electrode assembly; an insulating member having a frame shape and joined at an outer peripheral edge of the membrane electrode assembly; a first separator facing the membrane electrode assembly and the insulating member; a second separator facing the first separator on a side opposite to the membrane electrode assembly and the insulating member; and a gasket joined to the insulating member and protruding to a side opposite to the first separator, a hole penetrates through the insulating member and the first and second separators, and is located outside the membrane electrode assembly, a fluid of either reactant gas or coolant flowing through the hole, the gasket extends around the hole on the insulating member, a flow path portion is formed in at least one of the first and second separators and is formed in a region facing the membrane electrode assembly, the first and second separators define a communicating portion communicating the hole with the flow path portion and extending so as to intersect a part of the gasket, one of the first and second separators includes: first and second protruding portions protruding toward and contacting the other of the first and second separators, and separated from each other in such a direction as to intersect the gasket; and a recessed portion adjacent to the first and second protruding portions in a direction in which the gasket extends, recessed from the first and second protruding portions to be away from the other of the first and second separators, and extending to intersect the gasket, at least a part of the communicating portion is defined by the first and second protruding portions, the recessed portion, and the other of the first and second separators, and the first separator includes a support portion located between the first and second protruding portions, spaced apart from the second separator, and contacting and supporting the insulating member on a back side of the gasket.

The support portion of the first separator contacts and supports the insulating member on the back side of the gasket, between the first and second protruding portions defining at least a part of the communication portion. Accordingly, the support portion of the first separator receives the reaction force of the gasket, which suppresses an increase in the number of parts and also suppresses deterioration of the sealing property.

A space between the support portion and the second separator may communicate with the communicating portion.

The one of the first and second separators may be the first separator, the other of the first and second separators may be the second separator, and the recessed portion may support and contact the insulating member on a back side of the gasket.

The unit cells may include first and second unit cells, the second unit cell may face the second separator of the first unit cell on a side opposite to the first separator of the first unit cell, the second separator of the first unit cell may include a pressing portion pressing the gasket of the second unit cell, and the pressing portion may protrude toward the first separator of the first unit cell and may contact and support the first and second protruding portions of the first unit cell.

The one of the first and second separators may be the second separator, the other of the first and second separators may be the first separator, the unit cells may include first and second unit cells, the second unit cell may face the second separator of the first unit cell on a side opposite to the first separator of the first unit cell, the second separator of the first unit cell may include a pressing portion pressing the gasket of the second unit cell, and the pressing portion may be recessed from the first and second protruding portions of the first unit cell to be away from the first separator of the first unit cell.

The fluid may be the coolant, and the flow path portion may be defined between the first and second separators.

The fluid may be the reactant gas, the unit cells may include first and second unit cells, and the flow path portion of the first unit cell may be defined between the second separator of the first unit cell, and the insulating member and the membrane electrode assembly of the second unit cell adjacent to the second separator of the first unit cell on a side opposite to the first separator of the first unit cell.

A length, of a portion of the first separator spaced apart from the insulating member on the back side of the gasket, in a direction in which the gasket extends, may be less than 1 mm.

The first separator may contact and support the insulating member on the back side of the gasket over an entire area of the gasket.

BRIEF DESCRIPTION OF THE DRAWINGS

FIGS. 5A and 5B are cross-sectional views, respectively corresponding to line A-A and line B-B in FIG. 4, of the stack around a communicating portion through which a coolant flows;

FIGS. 8A and 8B are cross-sectional views of the stack respectively corresponding to line C-C and line D-D in FIG. 7;

FIGS. 9A to 9C are enlarged views of protruding portions formed in the vicinity of the hole of separators according to variations; and FIGS. 10A to 10C are enlarged views of protruding portions formed in the vicinity of the hole of separators according to variations.

DETAILED DESCRIPTION

Figure 1:
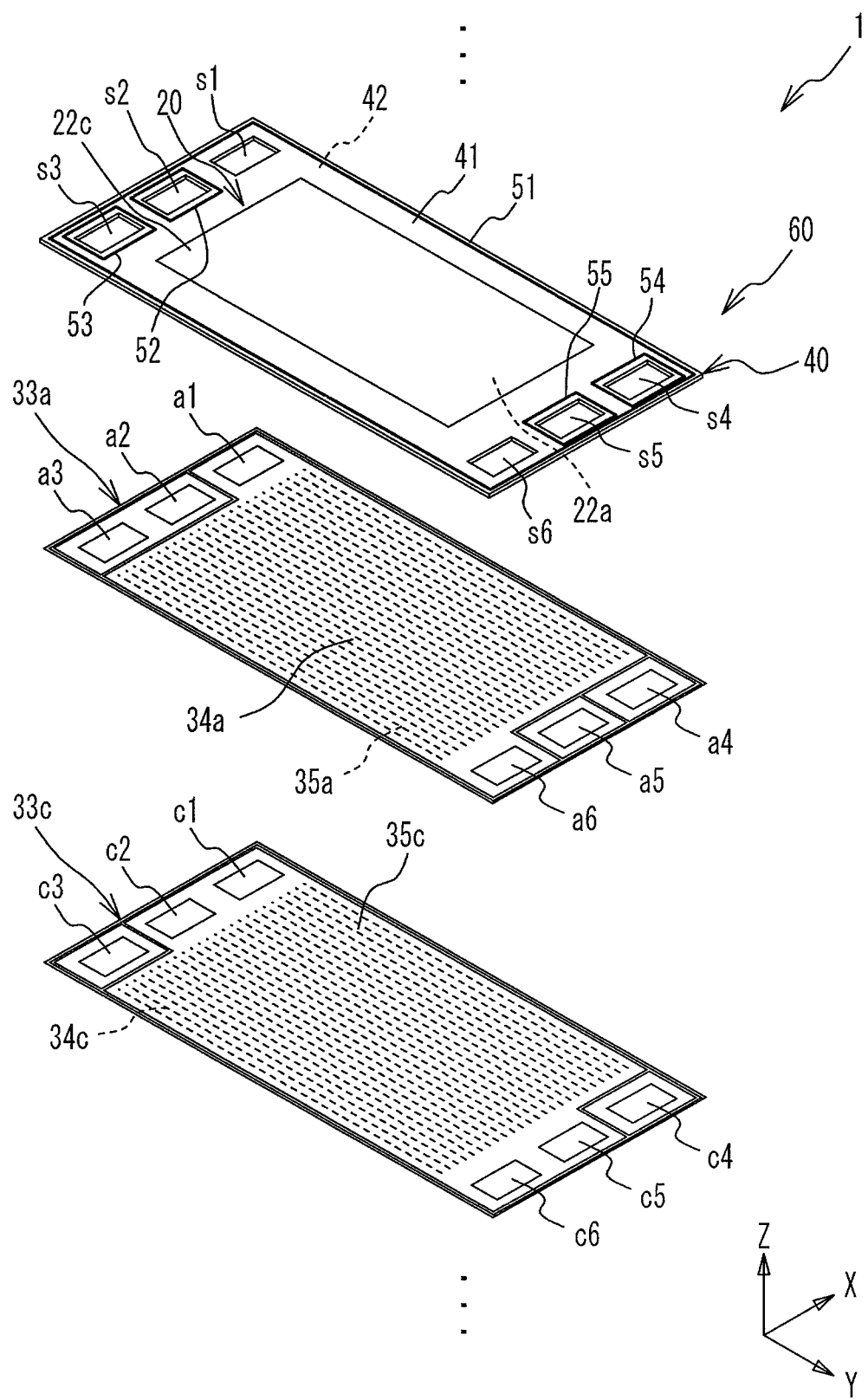
FIG. 1 is an exploded perspective view of a unit cell of a fuel cell stack.

FIG. 1 is an exploded perspective view of a unit cell 60 of a fuel cell stack (hereinafter referred to as a stack) 1. The stack 1 is configured by stacking the unit cells 60. In FIG. 1, only one unit cell 60 is illustrated, and other unit cells are omitted. The unit cell 60 is stacked together with other unit cells in the Z direction illustrated in FIG. 1. The unit cell 60 has a substantially rectangular shape. The longitudinal direction and the short direction of the unit cell 60 respectively correspond to the Y direction and the X direction illustrated in FIG. 1.

The unit cell 60 is a polymer electrolyte fuel cell that generates electric power with supplied anode gas (for example, hydrogen) and cathode gas (for example, oxygen) as reactant gases. The unit cell 60 includes a membrane electrode gas diffusion layer assembly (hereinafter referred to as MEGA (Membrane Electrode Gas diffusion layer Assembly)) 20, an insulting member 40, an anode separator (hereinafter referred to as separator) 33a, and a cathode separator (hereinafter referred to as separator) 33c. The insulting member 40 holds the MEGA 20. The unit cells 60 are stacked as described above. Thus, the MEGA 20 and the insulating member 40 illustrated in FIG. 1 face the cathode separator of the other unit cell, not illustrated and adjacent to the unit cell 60 on the +Z direction side thereof. Further, the separator 33c in FIG. 1 faces the insulting member and the MEGA of the other unit cell, not illustrated and adjacent to the unit cell on the −Z direction side thereof.

The MEGA 20 includes an anode gas diffusion layer 22a and a cathode gas diffusion layer 22c (hereinafter referred to as diffusion layers). The insulting member 40, made of a resin with insulating property, is formed into a substantially frame shape. The MEGA 20 is joined to an inner peripheral edge side of the insulting member 40. Holes s1 to s3 are formed along one side of two short sides of the insulting member 40, and holes s4 to s6 are formed along the other side. Similarly, holes a1 to a3 are formed along one side of two short sides of the separator 33a, and holes a4 to a6 are formed along the other side. Holes c1 to c3 are formed along one side of two short sides of the separator 33c, and holes c4 to c6 are formed along the other side. The holes s1, a1, and c1, communicating with one another, define an anode outlet manifold. Similarly, the holes s2, a2, and c2 define a coolant inlet manifold. The holes s3, a3, and c3 define a cathode inlet manifold. The holes s4, a4, and c4 define a cathode outlet manifold. The holes s5, a5, and c5 define a coolant outlet manifold. The holes s6, a6, and c6 define an anode inlet manifold. Liquid cooling water is used as a coolant. These holes are formed outside the MEGA 20 in the XY plane direction.

Anode flow path portions 34a along which the anode gas flows are formed on a surface of the separator 33a facing MEGA 20 so as to communicate the anode inlet with outlet manifolds. Coolant flow path portions 35a and 35c along which the coolant flows are respectively formed on the other surface opposite to the anode flow path portions 34a of the separator 33a and on a surface of the separator 33c facing the separator 33a so as to communicate the coolant inlet with outlet manifolds. Cathode flow path portions 34c along which the cathode gas flows are formed on the other surface of the separator 33c opposite to the coolant flow path portions 35c so as to communicate the cathode inlet with outlet manifolds. The anode flow path portions 34a and the coolant flow path portions 35a extend in the Y direction of the longitudinal direction of the separator 33a. Similarly, the cathode flow path portions 34c and the coolant flow path portions 35c extend in the Y direction of the longitudinal direction of the separator 33c. These flow path portions are provided in a region, facing the MEGA 20, of each separator. The separators 33a and 33c, each made of a material with gas blocking property and electro-conductivity, are thin plate shaped members formed of a metal such as pressed stainless steel, titanium or titanium alloy.

The insulating member 40 includes a surface 41 directed in the +Z direction, and a surface 42 opposite to the surface 41 and facing the separator 33a. On the surface 41 of the insulating member 40, gaskets 51 to 55 are joined. The gaskets 51 to 55 protrude in the +Z direction from the surface 41 of the insulating member 40. Each of the gaskets 51 to 55 is thicker than the insulating member 40. The gaskets 51 to 55 are each made of an elastic rubber. The gasket 51, extending along the outer peripheral edge of the insulating member 40, has a substantially rectangular frame shape surrounding the MEGA 20 and the holes s1 to s6. Each of the gaskets 52 to 55 has a substantially rectangular shape smaller than the gasket 51. The gaskets 52 to 55 extend and surround the holes s2 to s5, respectively. Although the gaskets 51 to 55 are separately formed and joined on the insulating member 40, the gaskets 51 to 55 are not limited thereto. At least one of the gaskets 51 to 55 and the insulating member 40 may be integrally formed of the same or different materials. Additionally, FIG. 1 illustrates the insulating member 40 and the separators 33a and 33c that are disassembled. Actually, the stack 1 is formed by stacking the unit cells 60 each of which includes the insulating member 40 joined to the separator 33a, and the separators 33a and 33c joined to each other.

Figure 2:
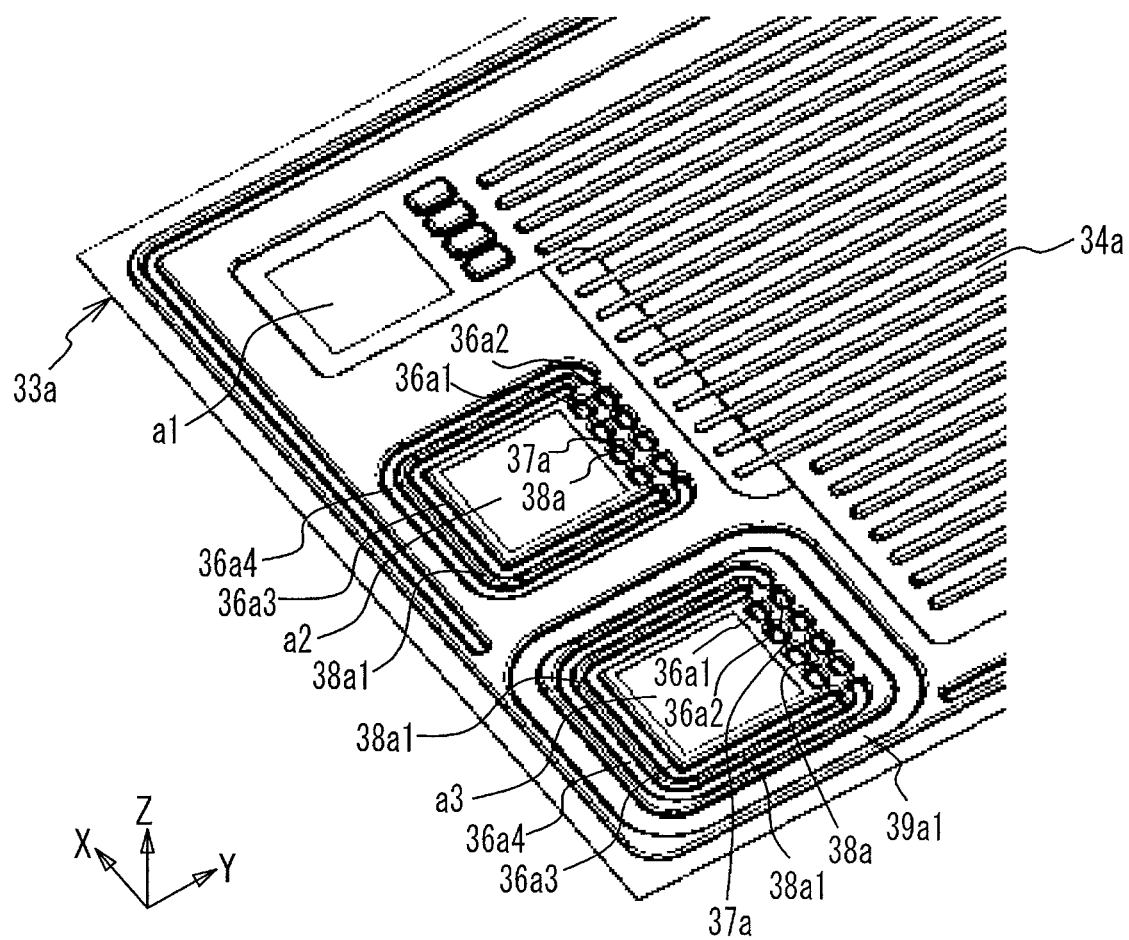
FIG. 2 is an enlarged perspective view around holes in a separator.

FIG. 2 is an enlarged perspective view around the holes a1 to a3 in the separator 33a. Protruding portions 36a1, protruding portions 36a2, a protruding portion 36a3, a protruding portion 36a4, recessed portions 37a, recessed portions 38a, and recessed portions 38a1 are formed around each of the holes a2 and a3 in the separator 33a. In FIG. 2, one of the protruding portions 36a1, one of the protruding portions 36a2, one of the recessed portions 37a, and one of the recessed portions 38a are denoted by numerical references. The protruding portions 36a1 to 36a4 protrude toward the separator 33c of the unit cell 60 with respect to the recessed portions 37a, 38a and 38a1, that is, in the −Z direction. In other words, the recessed portions 37a, 38a and 38a1 are recessed in the −Z direction with respect to the protruding portions 36a1 to 36a4. The protruding portions 36a1 to 36a4 are located on the same XY plane. The recessed portions 37a, 38a, and 38a1 are located on the same XY plane that is spaced apart in the +Z direction from the XY plane on which the protruding portions 36a1 to 36a4 are located. Additionally, a protruding portion 39a1 is formed in the periphery of the hole a3 outside the protruding portions 36a1 to 36a4. The protruding portion 39a1 is formed to surround the hole a3. The protruding portion 39a1 is located on the same XY plane on which the protruding portions 36a1 to 36a4 are located.

Figure 3:
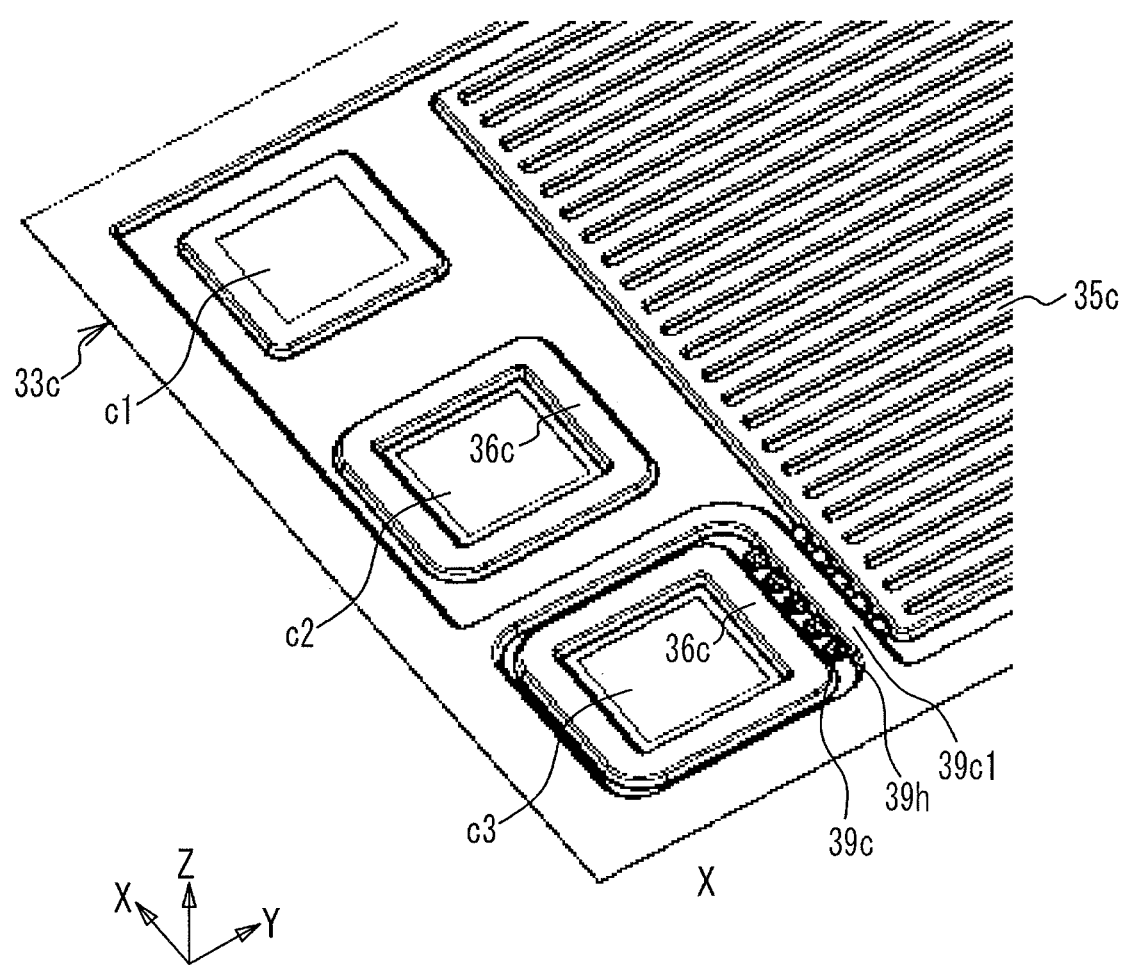
FIG. 3 is an enlarged perspective view around holes in a separator.

FIG. 3 is an enlarged perspective view around the holes c1 to c3 in the separator 33c. Protruding portion 36c is formed around each of the holes c2 and c3 in the separator 33c. The protruding portion 36c protrudes from the periphery thereof toward the separator 33a of the unit cell 60 including the separator 33c, that is, in the +Z direction. The protruding portion 36c is formed along four sides of the rectangular shape of the hole c2. Also, the protruding portion 36c is formed around the hole c3. Protruding portions 39c, communication holes 39h, and a protruding portion 39c1 are formed between the hole c3 and the coolant flow path portion 35c. The details will be described later.

Figure 4:
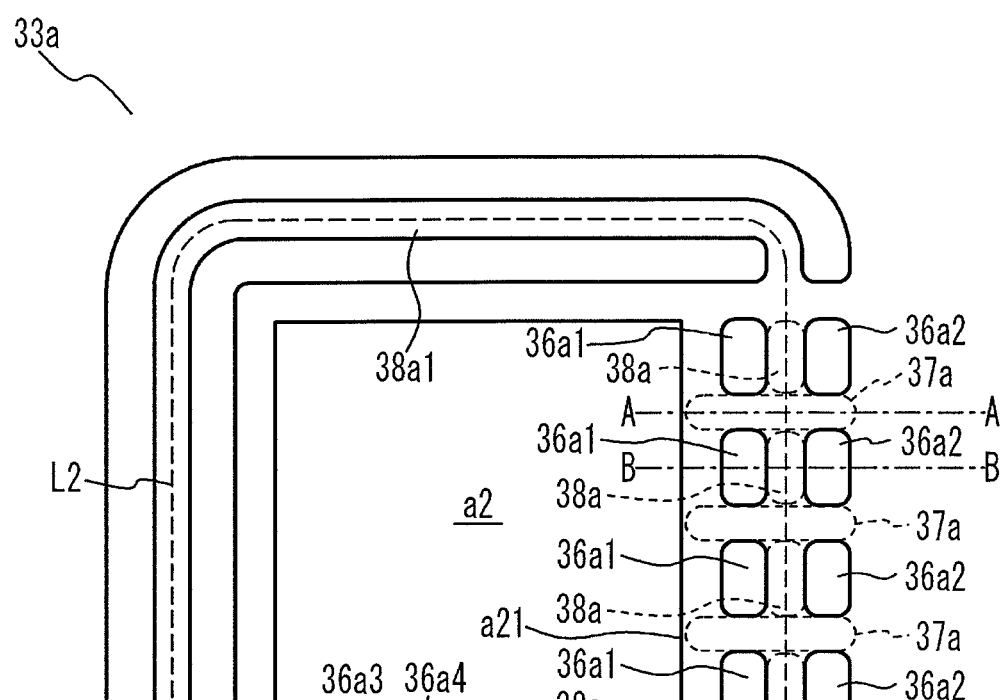
FIG. 4 is an enlarged view around the hole in the separator when viewed in the −Z direction.

FIG. 4 is an enlarged view around the hole a2 in the separator 33a when viewed in the −Z direction. Each of the protruding portions 36a1 and 36a2 has a substantially rectangular shape whose longitudinal direction is the X direction, but is not limited thereto. The protruding portions 36a1 and 36a2 have substantially the same shape and size but are not limited thereto. Each length of the protruding portions 36a1 and 36a2 is, for example, from 0.6 mm to 1.3 mm. The protruding portions 36a1 are arranged along a side a21, close to the side of the anode flow path portion 34a, of the inner peripheral edge of the substantially rectangular hole a2. The protruding portions 36a2 are arranged in a line along the side a21 at positions farther away from the holes a2 than the protruding portions 36a1. The protruding portion 36a3 extends along three sides other than the side a21. The protruding portion 36a4 extends along three sides other than the side a21 at a position further away from the hole a2 than the protruding portion 36a3. The protruding portions 36a1 and the protruding portion 36a3 are formed on the same substantially rectangular shape surrounding the hole a2. The protruding portions 36a2 and the protruding portion 36a4 are formed on the same substantially rectangular shape surrounding the hole a2.

The recessed portion 37a extends from the hole a2 toward the anode flow path portion 34a, that is, in the +Y direction between the two adjacent protruding portions 36a1 and between the two protruding portions 36a2 adjacent thereto in the +Y direction. The recessed portion 38a extends in the X direction between the protruding portions 36a1 and 36a2 adjacent to each other in the Y direction. The recessed portion 38a1 extends between these protruding portions 36a3 and 36a4.

Herein, as described above, the gasket 52 surrounds the hole s2 which defines the manifold in corporation with the hole a2. In FIG. 4, a seal line L2 of the gasket 52 is illustrated. The seal line L2 passes between the protruding portions 36a1 and the protruding portions 36a2 and between the protruding portions 36a3 and 36a4. Therefore, the protruding portions 36a1 and 36a2 are apart from each other in such a direction as to intersect the gasket 52. Likewise, the protruding portions 36a3 and 36a4 are apart from each other in such a direction as to intersect the gasket 52.

In addition, the recessed portion 37a extends to intersect and overlap a part of the seal line L2. The recessed portions 38a and 38a1 extend along and overlap a part of the seal line L2. Thus, the recessed portion 37a is adjacent to the protruding portions 36a1 and 36a2 in the direction in which the gasket 52 extends, and extends to intersect the gasket 52. The recessed portion 38a is located between the protruding portions 36a1 and 36a2 that are adjacent to each other in such a direction as to intersect the gasket 52. The recessed portion 38a1 is located between the protruding portions 36a3 and 36a4 that are adjacent to each other in such a direction as to intersect the gasket 52.

Like the periphery of the hole a2, the protruding portions 36a1 to 36a4, the recessed portions 37a, the recessed portions 38a, and the recessed portion 38a1 are formed around the hole a3.

FIGS. 5A and 5B are cross-sectional views, respectively corresponding to line A-A and line B-B in FIG. 4, of the stack 1 around a communicating portion R1. Although FIG. 4 does not illustrate the anode flow path portion 34a, FIGS. 5A and 5B illustrate the anode flow path portion 34a. FIGS. 5A and 5B illustrate the unit cell 60 and another unit cell 60a facing the unit cell 60 in the −Z direction. Since the configuration of the unit cell 60a is the same as that of the unit cell 60, duplicate explanation will be omitted.

Firstly, the MEGA 20 will be described. As illustrated in FIGS. 5A and 5B, the MEGA 20 includes the above-described diffusion layers 22c and 22a and a membrane electrode assembly (hereinafter referred to as MEA) 10. The MEA 10 includes: an electrolyte membrane having a substantially rectangular shape; and a cathode catalyst layer and an anode catalyst layer respectively formed on one surface and the other surface of the electrolyte membrane. The diffusion layers 22c and 22a are joined to the cathode catalyst layer and the anode catalyst layer, respectively. In the present embodiment, the diffusion layer 22c is larger than the diffusion layer 22a, and the MEA 10 is substantially the same size as the diffusion layer 22c. The inner peripheral edge side of the surface 41 of the insulating member 40 is joined to the anode catalyst layer of the MEA 10 exposed from the outer peripheral edge of the diffusion layer 22a.

Next, the shape of the gasket 52 will be briefly described. The cross section of the gasket 52 illustrated in FIGS. 5A and 5B is orthogonal to the direction in which the gasket 52 extends. In this sectional view, the gasket 52 includes: a bottom portion joined to the surface 41 of the insulating member 40; and a top portion protruding away from the surface 41 and the bottom portion. The gasket 52 is gradually narrowed from the bottom portion toward the top portion. Specifically, the top portion of the gasket 52 is flat, but not limited thereto, and it may be curved to have a convex shape in a protruding direction. The same applies to the sectional shapes of the other gaskets 51, and 53 to 55.

Next, the communicating portion R1 through which the coolant flows will be described. As illustrated in FIG. 5B, the protruding portions 36a1 and 36a2 of the separator 33a of the unit cell 60 contact the protruding portion 36c of the separator 33c of the unit cell 60. This ensures a distance between the separators 33a and 33c. Herein, the recessed portion 37a adjacent to the protruding portions 36a1 and 36a2 in the X direction is recessed away from the separator 33c as illustrated in FIG. 5A. Therefore, a space surrounded by the protruding portions 36a1 and 36a2, the recessed portion 37a, and the protruding portion 36c of the separator 33c is defined as a part of the communicating portion R1. Herein, the communicating portion R1 communicates the holes s2, a2, and c2 and the coolant flow path portions 35a and 35c. Thus, the coolant flowing through the holes s2, a2, and c2 flows through the communicating portion R1 to the coolant flow path portions 35a and 35c, thereby cooling the MEA 10.

As illustrated in FIG. 5B, the recessed portion 38a contacts the surface 42 of the insulating member 40 on the back side of the gasket 52 away from the protruding portion 36c of the separator 33c between the protruding portions 36a1 and 36a2, and supports the insulating member 40. Therefore, the recessed portion 38a receives the reaction force of the gasket 52, thereby suppressing the sealing property from being degraded by bending the insulating member 40 and the gasket 52. The separator 33a is provided with the recessed portion 38a for receiving the reaction force of the gasket 52 through the insulating member 40 in this manner, thereby suppressing the deterioration of the sealing property and suppressing an increase in the number of parts.

The protruding portions 36a1 and 36a2 of the separator 33a are an example of first and second protruding portions protruding toward and contacting the separator 33c, and separated from each other in such a direction as to intersect the gasket 52. The recessed portion 37a of the separator 33a is an example of a recessed portion adjacent to the protruding portions 36a1 and 36a2 in a direction in which the gasket 52 extends, recessed from the protruding portions 36a1 and 36a2 to be away from the separator 33c, and extending to intersect the gasket 52. The recessed portion 38a is an example of a support portion located between the protruding portions 36a1 and 36a2, spaced apart from the separator 33c, and contacting and supporting the insulating member 40 on a back side of the gasket 52. Also, in the present embodiment, the separator 33a is an example of a first separator, and the separator 33c is an example of a second separator.

The protruding portions 36a1 and 36a2 sandwiching the recessed portion 38a contact the protruding portion 36c of the separator 33c as described above, whereby the recessed portion 38a receiving the reaction force of the gasket 52 is supported by the protruding portions 36a1 and 36a2 and the protruding portion 36c of the separator 33c. It is also possible to receive the reaction force of the gasket 52, and to suppress the deterioration of the sealing property.

As described above, the recessed portion 37a defining at least a part of the communicating portion R1 contacts and supports the surface 42 of the insulating member 40 on the back side of the gasket 52. It is thus possible to receive the reaction force of the gasket 52. Although not illustrated in FIGS. 5A and 5B, the recessed portion 38a1 also contacts and supports the surface 42 of the insulating member 40 on the back side of the gasket 52. It is possible to receive the reaction force of the gasket 52. In this manner, the separator 33a contacts and supports the insulating member 40 on the back side of the gasket 52 over the entire area thereof. It is thus possible to receive the reaction force over the entire area of the gasket 52, and to suppress the sealing property.

Further, the protruding portions 36a3 and 36a4 sandwiching the recessed portion 38a1 contact the protruding portion 36c of the separator 33c, whereby the recessed portion 38a1 for receiving the reaction force of the gasket 52 is supported by the protruding portions 36a3 and 36a4 and the protruding portion 36c of the separator 33c. In this manner, the separators 33a and 33c receive the reaction force over the entire area of the gasket 52, thereby suppressing the deterioration of the sealing property.

Herein, in a case where a length of a portion of the recessed portion 38a contacting the insulating member 40 is too long in the Y direction, the separator 33a may be bent together with the gasket 52 and the insulating member 40 due to the reaction force of the gasket 52. For this reason, the above length is preferably short to some extent. Therefore, the above length is, for example, less than 5 mm, preferably less than 3 mm, more preferably less than 2 mm. However, if the length is too short, the recessed portion 38a might be positionally displaced with respect to the gasket 52 due to dimensional tolerance and assembling tolerance, and the recessed portion 38a might not be able to sufficiently receive the reaction force of the gasket 52. Accordingly, the above length is, for example, 0.5 mm or more, preferably 1 mm or more.

Further, the protruding portion 36c of the unit cell 60 contacts a tip of the gasket 52 of the unit cell 60a. Therefore, the separator 33c of the unit cell 60 suppress the insulating member 40 of the unit cell 60 from being bent, and presses the gasket 52 of the unit cell 60, thereby suppressing the deterioration of the sealing property. The protruding portion 36c of the unit cell 60 is an example of a pressing portion pressing the gasket 52 of the unit cell 60a.

Further, the gaskets 51 to 55 are joined on the insulating member 40. Thus, the insulating member 40 is substantially uniform in thickness, for example, as compared with the separator 33a that is formed with the protruding portions and the recessed portions as described above. It is thus easy to ensure a joining area between the insulating member 40 and each of the gaskets 51 to 55. For example, as illustrated in FIG. 5B, if it is attempted to directly join the gasket 52 to the +Z direction side surface of the recessed portion 38a of the separator 33a, a joining area therebetween might not be ensured and the gasket 52 might be peeled off from the recessed portion 38a. However, the occurrence of such a problem is suppressed in the present embodiment.

As illustrated in FIGS. 4, 5A, and 5B, the space between the recessed portion 37a and the protruding portion 36c communicates with the space between the recessed portion 38a and the protruding portion 36c. Therefore, the coolant flows in the space between the recessed portion 37a and the protruding portion 36c, and also flows in the space between the recessed portion 38a and the protruding portion 36c. Therefore, for example, even when a foreign matter mixed in the coolant is caught between the recessed portion 37a and the protruding portion 36c, the coolant flows toward the coolant flow path portion 35a through the space between the recessed portion 38a and the protruding portion 36c, thereby suppressing a decrease in the flow rate of the coolant.

Figure 6A:
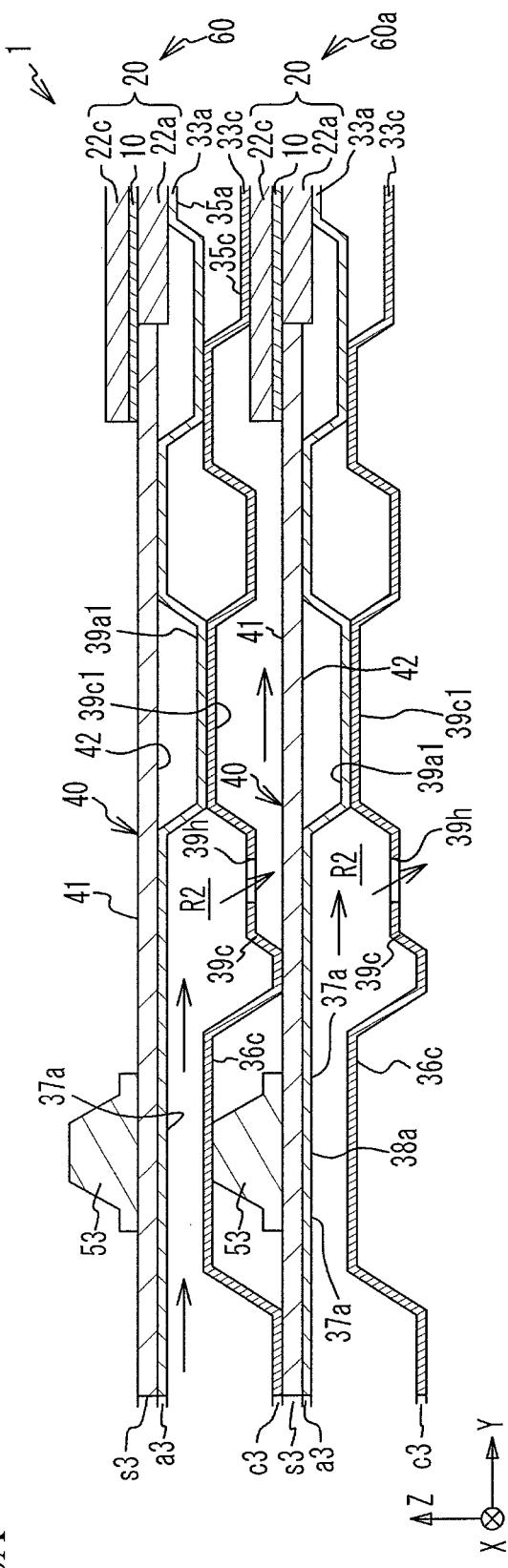
FIGS. 6A and 6B are cross-sectional views of the stack around a communicating portion through which a cathode gas flows.
Figure 6B:
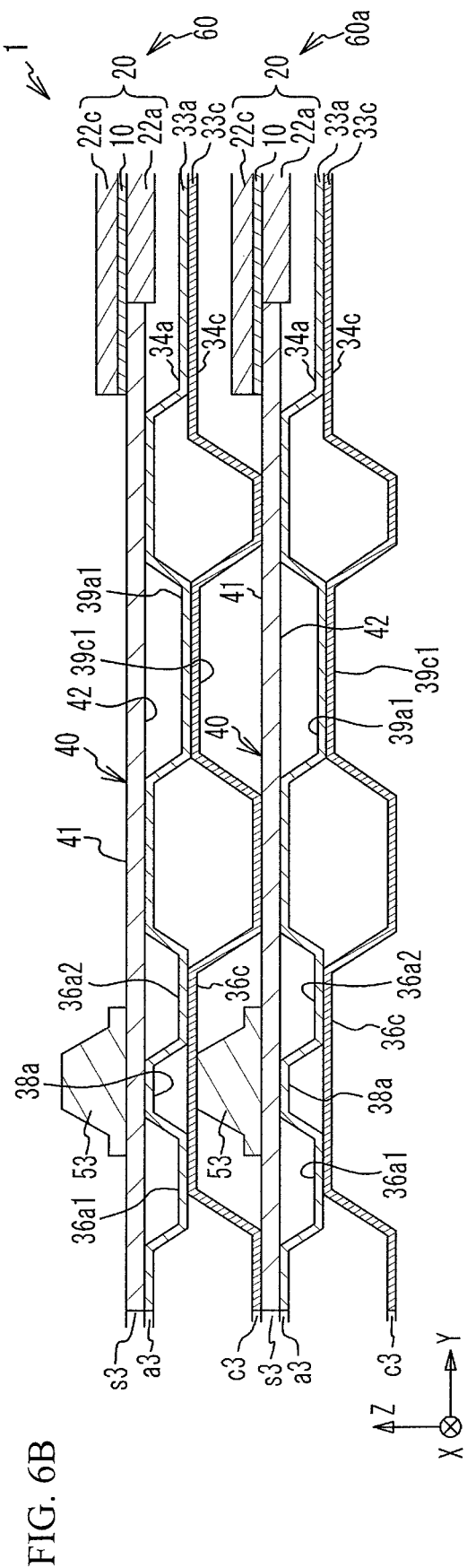

The peripheries of the holes s3, a3, and c3 are configured in substantially the same manner as the holes s2, a2, and c2. FIGS. 6A and 6B are cross-sectional views of the stack around the communicating portion R2 through which the cathode gas flows. FIGS. 6A and 6B correspond to FIGS. 5A and 5B, respectively. Like the communicating portion R1, at least a part of the communicating portion R2 is defined by the protruding portions 36a1 and 36a2, the recessed portion 37a, and the protruding portion 36c of the separator 33c. However, the communicating portion R2 differs in the following points.

The protruding portion 39c of the separator 33c slightly protrudes in the +Z direction away from the surface 41 of the insulating member 40, but the protrusion height of the protruding portion 39c is lower than that of the protruding portion 36c. As illustrated in FIG. 3, the protruding portions 39c are formed along one, of four sides of the protruding portion 36c having a substantially rectangular shape, between the protruding portion 39c and the coolant flow path portion 35c. That is, the protruding portions 39c are arranged at predetermined intervals in the X direction. The protruding portion 39c is formed with a communication hole 39h penetrating therethrough in its thickness direction. The protruding portion 39c1 is formed between the coolant flow path portion 35c and the protruding portion 39c, protrudes in the +Z direction away from the surface 41 of the insulating member 40, and contacts the protruding portion 39a1. Also, the protruding portions 39a1 and 39c1 contact each other, which ensures the distance between the separators 33a and 33c. As illustrated in FIG. 6A, the cathode gas flowing between the recessed portion 37a and the protruding portion 36c flows between the separator 33c of the unit cell 60 and the surface 41 of the insulating member 40 of the unit cell 60a through the communication hole 39h, and is supplied to the diffusion layer 22c of the unit cell 60a.

As illustrated in FIG. 6B, the protruding portions 36a1 and 36a2 and the recessed portions 38a around the hole a3, and the protruding portion 36c around the hole c3 have the same structure as those around the above-described holes a2 and c2. For this reason, it is possible to receive the reaction force of the gasket 53 by the structures around the holes a2 and c2, thereby suppressing the deterioration of the sealing property and suppressing the increase in the number of parts.

The structures of the separators 33a and 33c around the holes a4 and c4 and around the holes a5 and c5 are also formed in the same manner as the structures around the holes a2 and c2 and the structures around the holes a3 and c3. It is therefore possible to receive the reaction force of the gaskets 54 and 55 by the separators 33a and 33c, thereby suppressing the deterioration of the sealing property and suppressing the increase in the number of parts.

Figure 7:
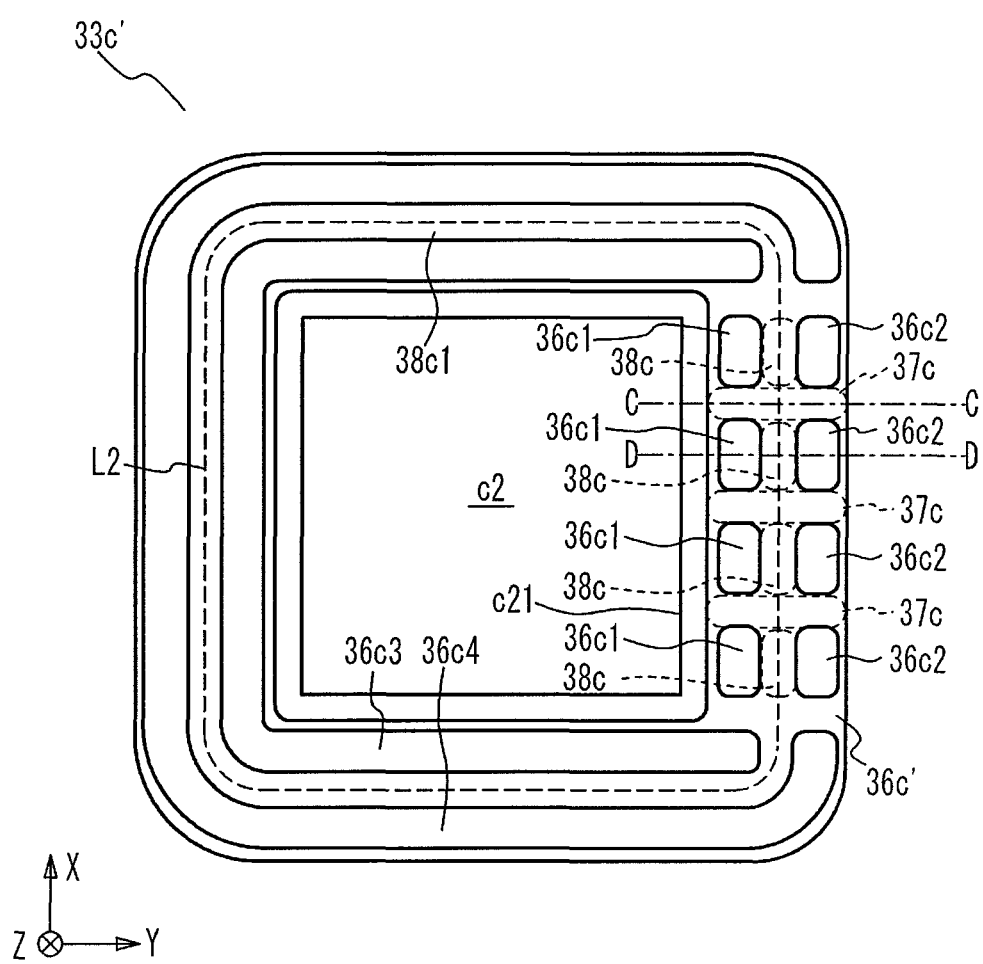
FIG. 7 is an enlarged view around the hole of a separator of a unit cell of a stack according to a variation when viewed in the −Z direction.

Next, variations will be described. Incidentally, in the variations described below, the same reference numerals are given to the same components as those in the above embodiment, and redundant description will be omitted. FIG. 7 is an enlarged view around the hole c2 of a separator 33c' of a unit cell 60' of a stack 1' according to a variation when viewed in the −Z direction. FIGS. 8A and 8B are cross-sectional views of the stack 1' corresponding to line C-C and line D-D in FIG. 7, respectively. FIGS. 8A and 8B correspond to FIGS. 6A and 6B, respectively.

As illustrated in FIG. 7, a protruding portion 36c' is formed around the hole c2 of the separator 33c'. Protruding portions 36c1, protruding portions 36c2, a protruding portion 36c3, a protruding portion 36c4, recessed portions 37c, recessed portions 38c, and a recessed portion 38c1 are formed on the protruding portion 36c'. As illustrated in FIGS. 8A and 8B, the protruding portion 36c' protrudes in the +Z direction from its peripheral portion. The protruding portions 36c1 to 36c4 protrude in the +Z direction from the recessed portions 37c, 38c and 38c1. The recessed portions 37c and 38c are formed on a top surface of the protruding portion 36c' and are recessed in the −Z direction from the protruding portions 36c1 to 36c4, but protrude in the +Z direction from the periphery of the protruding portion 36c'. Herein, the protruding portions 36c1 to 36c4 are located on the same XY plane. The recessed portions 37c, 38c, and 38c1 are located on the same XY plane that is spaced away in the −Z direction from the XY plane where the protruding portions 36c1 to 36c4 are located.

The protruding portions 36c1 and 36c2 each has a substantially rectangular shape whose longitudinal direction is the X direction, but is not limited thereto. The protruding portions 36c1 and 36c2 have substantially the same shape and size, but are not limited thereto. Each length of sides of the protruding portions 36c1 and 36c2 is, for example, 0.6 mm to 1.3 mm. The protruding portions 36c1 are arranged along a side c21, on the cathode flow path portion 34c, of the inner peripheral edge of the hole c2 having a substantially rectangular shape. The protruding portions 36c2 are arranged in a row along the side c21 and are further distant away from the hole c2 than the protruding portions 36c1. The protruding portion 36c3 extends along three sides other than the side c21. The protruding portion 36c4 extends along three sides other than the side c21 and is further distant away from the hole c2 than the protruding portion 36c3. The protruding portions 36c1 and the protruding portion 36c3 are formed on the same substantially rectangular line surrounding the hole c2. The protruding portions 36c2 and the protruding portion 36c4 are formed on the same substantially rectangular line surrounding the hole c2.

The recessed portion 37c is located between the two adjacent protruding portions 36c1 and between the two protruding portions 36c2 adjacent to the two protruding portions 36c1 in the Y direction, and extends from the hole c2 toward the cathode channel portion 34c, that is, in the +Y direction. Additionally, the recessed portion 38c extends in the X direction between the protruding portions 36c1 and 36c2 that are adjacent to each other in the Y direction. The recessed portion 38c1 extends along and between the protruding portions 36c3 and 36c4. In a state where separators 33a' and 33c', to be described later, are stacked, the protruding portions 36c1 to 36c4 contact a flat portion 38a', to be described later, of a separator 33a'.

FIG. 7 illustrates a seal line L2 by the gasket 52. The seal line L2 passes between the adjacent protruding portions 36c1 and 36c2 and between the protruding portions 36c3 and 36c4. Therefore, the protruding portions 36c1 and 36c2 are spaced away from each other in such a direction as to intersect the gasket 52. Likewise, the protruding portions 36c3 and 36c4 are spaced away from each other in such a direction as to intersect the gasket 52.

In addition, the recessed portion 37c extends so as to intersect a part of the seal line L2, and the recessed portions 38c and 38c1 overlap the seal line L2 and extend along a part thereof. Accordingly, the recessed portion 37c is adjacent to the protruding portions 36c1 and 36c2 in the direction in which the gasket 52 extends, and extends so as to intersect the gasket 52. The recessed portion 38c is located between the protruding portions 36c1 and 36c2 that are adjacent to each other in such a direction as to intersect the gasket 52. The recessed portion 38c1 is located between the protruding portions 36c3 and 36c4 that are adjacent to each other in such a direction as to intersect the gasket 52.

As illustrated in FIGS. 8A and 8B, unlike the separator 33a of the above-described embodiment, the separator 33a' of the unit cell 60' of the stack 1' is not formed with the protruding portions 36a1 and 36a2 around the hole a2. The separator 33a' of the unit cell 60' is formed with the flat portion 38a' that has a flat plate shape and contacts the surface 42 of the insulating member 40 of the unit cell 60'.

As illustrated in FIG. 8B, the protruding portions 36c1 and 36c2 of the separator 33c' of the unit cell 60' contact the flat portion 38a' of the separator 33a' of the unit cell 60'. This ensures the distance between the separators 33a' and 33c'. Herein, as illustrated in FIG. 8A, the recessed portion 37c is recessed away from the separator 33a', as compared with the protruding portions 36c1 and 36c2. Therefore, a part of a communicating portion R1' is defined by the protruding portions 36c1 and 36c2, the recessed portion 37c, and the flat portion 38a'. Thus, the coolant flowing through the holes s2, a2, and c2 flows through the communicating portion R1' to the coolant flow path portions 35a and 35c.

The flat portion 38a' has a substantially rectangular shape and contacts the surface 42 of the insulating member 40 over the entire back side of the gasket 52 having the substantially rectangular frame shape. The area of the flat portion 38a' contacting the surface 42 of the insulating member 40 is larger than the area of the recessed portions 37a and 38a of the above-described embodiment contacting the surface 42 of the insulating member 40. In this way, the flat portion 38a' contacts and supports the surface 42 of the insulating member 40 on the back side of the gasket 52. In addition, since the protruding portions 36c1 and 36c2 contact the flat portion 38a' of the separator 33a' as described above, the protruding portions 36c1 and 36c2 supports the flat portion 38a' receiving the reaction force of the gasket 52. This also makes it possible to receive the reaction force of the gasket 52, and suppresses the deterioration of the sealing property.

The protruding portions 36c1 and 36c2 are an example of first and second protrusions protruding toward and contacting the separator 33a', and separated from each other in such a direction as to intersect the gasket 52. The recessed portion 37c is an example of a recessed portion adjacent to the protruding portions 36c1 and 36c2 in a direction in which the gasket 52 extends, recessed from the protruding portions 36c1 and 36c2 to be away from the separator 33a', and extending to intersect the gasket 52. The flat portion 38a' is an example of a support portion located between the protruding portions 36c1 and 36c2, spaced apart from the separator 33c', and contacting and supporting the insulating member 40 on a back side of the gasket 52. In this variation, the separator 33a' is an example of the second separator, and the separator 33c' is an example of the first separator.

The recessed portions 37c and 38c of the unit cell 60' contact the tip of the gasket 52 of a unit cell 60a'. Thus, the separator 33c' of the unit cell 60' suppresses the bending of the insulating member 40 of the unit cell 60', and compresses the gasket 52 of the unit cell 60a' to suppress the deterioration of the sealing property. The recessed portions 37c and 38c of the unit cell 60' are an example of a pressing portion pressing the gasket 52 of the unit cell 60a'.

If the length, in the Y direction, of the portion of the recessed portion 38c contacting the gasket 52 is too long, the length between the protruding portions 36c1 and 36c2 in the Y direction also is long. Thus, the flat portion 38a' of the separator 33a' that receives the reaction force of the gasket 52 between the protruding portions 36c1 and 36c2 might be bent together with the insulating member 40. It is thus preferable that the above length is short to some extent. Therefore, the above length is, for example, less than 5 mm, preferably less than 3 mm, more preferably less than 2 mm. However, if the length is too short, the recessed portion 38c might be positionally displaced with respect to the gasket 52 pushed thereby due to dimensional tolerance and assembling tolerance, and the gasket 52 might not be pressed with sufficient force by the recessed portion 38c. Thus, the sealing property might be deteriorated. Therefore, the above length is, for example, 0.5 mm or more, preferably 1 mm or more.

Next, variations of the above-described separator 33a will be described. FIGS. 9A to 10C are enlarged views of protruding portions formed in the vicinity of the hole 2a of separators according to variations. In FIGS. 9A to 10C, illustration of the hole 2a is omitted.

A separator 43a according to a variation illustrated in FIG. 9A is formed with protruding portions 46a1 and 46a2 that each has a substantially circular shape when viewed in the −Z direction, instead of the protruding portions 36a1 and 36a2 in the above-described separator 33a. The separator 43a is formed with recessed portions 47a and 48a, instead of the recessed portions 37a and 38a in the above-described separator 33a. Since the protruding portions 46a1 and 46a2 each has a substantially circular shape, it is easy to form the protruding portions 46a1 and 46a2 by pressing. Each diameter of the protruding portions 46a1 and 46a2 is, for example, 0.6 mm to 1.3 mm.

A separator 43a1 according to a variation illustrated in FIG. 9B is formed with a protruding portion 46a5, in addition to the protruding portions 46a1 and 46a2. Unlike the variation illustrated in FIG. 9A, in the separator 43a1, the pitch interval in the X direction between the protruding portions 46a1 is large, and the pitch interval in the X direction between the protruding portions 46a2 is large. The protruding portion 46a5 is sandwiched between the protruding portions 46a1 adjacent to each other in the X direction, and between the protruding portions 46a2 adjacent to each other in the X direction. The protruding portion 46a5 is positioned between the protruding portions 46a1 and 46a2 adjacent to each other in the Y direction. In other words, the protruding portions 46a1, 46a2, and 46a5 are arranged in a zigzag manner. The protruding portion 46a5 overlaps the seal line L2. Accordingly, the protruding portion 46a5 does not support the surface 42 of the insulating member 40 on the back side of the gasket 52, but the other recessed portions 48a support the surface 42 of the insulating member 40.

The recessed portions 47a1 are formed between the protruding portions 46a1 and 46a2, adjacent to each other in the Y direction, and the protruding portion 46a5, adjacent to the protruding portions 46a1 and 46a2 in the X direction. The recessed portions 47a1 are formed between the protruding portion 46a5 and the protruding portions 46a1 and 46a2 adjacent thereto on the +X direction side, and between the protruding portion 46a5 and the protruding portions 46a1 and 46a2 adjacent thereto on the −X direction side. An area of the recessed portion 47a1 is enlarged on the −Y direction side with respect to the protruding portion 46a5 when viewed in the −Z direction, the area is reduced near the protruding portion 46a5, and the area is enlarged again on the +Y direction side with respect to the protruding portion 46a5. Such recessed portions 47a1 contact and support the surface 42 of the insulating member 40, the reaction force of the gasket 52 is received.

In the variation illustrated in FIG. 9B, the size of only the protruding portion 46a5 overlapping the seal line L2 may be smaller than each size of the protruding portions 46a1 and 46a2 not overlapping the seal line L2. This is because the small size of the protruding portion 46a5 ensures the area for contacting and supporting the surface 42 of the insulating member 40 on the back side of the gasket 52. For example, the length of the protruding portion 46a5 in the direction in which the gasket 52 extends, that is, the length in the longitudinal direction of the seal line L2 is, for example, less than 1 mm, preferably less than 0.5 mm, more preferably less than 0.3 mm. The protruding portion 46a5 is an example of a portion separated from the insulating member 40 on the back side of the gasket 52 of the separator 43a1.

In a separator 43a2 according to a variation illustrated in FIG. 9C, a phase of the protruding portions 46a1 linearly arranged differs from a phase of the protruding portions 46a2. Accordingly, a recessed portion 47a2 is formed so as to pass between the two protruding portions 46a1 adjacent to each other in the X direction and between the two protruding portions 46a2 adjacent to each other in the X direction, the two protruding portions 46a2 being adjacent to the above two protruding portions 46a1 to each other in the Y direction. Therefore, the recessed portion 47a2 is partially curved in accordance with the phase difference between the protruding portions 46a1 and 46a2 when viewed in the −Z direction. A recessed portion 48a2 is formed between the protruding portions 46a1 and 46a2 closest to each other in the Y direction. Since the recessed portions 48a2 overlap the seal line L2, the reaction force of the gasket 52 is received.

A separator 53a according to a variation illustrated in FIG. 10A is formed with protruding portions 56a1 and 56a2 each having a substantially square shape, instead of the protruding portions 36a1 and 36a2 in the above-described separator 33a. Further, the separator 53a is formed with recessed portions 57a and 58a, instead of the recessed portions 37a and 38a of the above-described separator 33a. A length of each side of the protruding portions 56a1 and 56a2 is, for example, 0.6 mm to 1.3 mm.

A separator 53a1 according to a variation illustrated in FIG. 10B is formed with protruding portions 56a1, 56a2, and 56a5 in a zigzag manner. A recessed portion 57a1 is similar to the recessed portion 47a1 of the above-described separator 43a1. When viewed in the −Z direction, an area of the recessed portion 57a1 is enlarged on the −Y direction side with respect to the protruding portion 56a5, the area is reduced near the protruding portion 56a5, and the area is again enlarged on the +Y direction side with respect to the protruding portion 56a5. In the separator 53a1 as well as the separator 43a1, the protruding portions 56a5 overlaps the seal line L2. A length of the protruding portion 56a5 in the direction in which the gasket 52 extends, that is, the length in the longitudinal direction of the seal line L2 is, for example, less than 1 mm, preferably less than 0.5 mm, more preferably less than 0.3 mm.

In a separator 53a2 according to a variation illustrated in FIG. 10C, the phase of the protruding portions 56a1 linearly arranged differs from the phase of the protruding portions 56a2 linearly arranged. When viewed in the −Z direction, a recessed portion 57a2 is partially bent in accordance with the phase difference between the protruding portions 56a1 and 56a2. A recessed portion 58a2 is formed between the protruding portions 56a1 and 56a2 closest to each other in the Y direction. Since the recessed portions 58a2 overlap the seal line L2, the reaction force of the gasket 52 is received.

In the variations illustrated in FIGS. 9A to 10C, the protruding portion has a circular shape or a square shape when viewed in the −Z direction, but is not limited thereto. For example, the protruding portion may have an elliptical shape, a rectangular shape, or a polygonal shape with corners whose number is 5 or more. Additionally, the same separator may be formed with protruding portions having two or more different shapes such as a circular shape, an elliptical shape, a square shape, and a rectangular shape.

Although some embodiments of the present disclosure have been described in detail, the present disclosure is not limited to the specific embodiments but may be varied or changed within the scope of the present disclosure as claimed.

The configurations of the embodiment and variations described above may be applied to the vicinity of a hole through which the anode gas flows. The separator in the above-described embodiments and variations is a so-called parallel groove type, but may be of a serpentine type.

What is claimed is:
1. A fuel cell stack in which unit cells are stacked, wherein at least one of the unit cells includes:
    a membrane electrode assembly;
    an insulating member having a frame shape and being joined at an outer peripheral edge of the membrane electrode assembly;
    a first separator facing the membrane electrode assembly and the insulating member;
    a second separator facing the first separator on a side opposite to the membrane electrode assembly and the insulating member; and
    a gasket joined to the insulating member and protruding to a side opposite to the first separator,
    a hole penetrates through the insulating member and the first and second separators, and is located outside the membrane electrode assembly, a fluid of either reactant gas or coolant flowing through the hole,
    the gasket of the at least one unit cell extends around the hole on the insulating member,
    a flow path portion is formed in at least one of the first and second separators and is formed in a region facing the membrane electrode assembly,
    the first and second separators define a communicating portion communicating the hole with the flow path portion and extending so as to intersect a part of the gasket of the at least one unit cell,
    one of the first and second separators includes:
        first and second protruding portions protruding toward and contacting the other of the first and second separators, and separated from each other in such a direction as to intersect a gasket of an adjacent unit cell; and
        a recessed portion adjacent to the first and second protruding portions in a direction in which the gasket of the adjacent unit cell extends, recessed from the first and second protruding portions to be away from the other of the first and second separators, and extending to intersect the gasket of the adjacent unit cell,
    at least a part of the communicating portion is defined by the first and second protruding portions, the recessed portion, and the other of the first and second separators, and
    the first separator includes a support portion located between the first and second protruding portions, spaced apart from the second separator, and contacting and supporting the insulating member on a back side of the gasket of the at least one unit cell.
2. The fuel cell stack of claim 1, wherein a space between the support portion and the second separator communicates with the communicating portion.
3. The fuel cell stack of claim 1, wherein
    the one of the first and second separators is the first separator,
    the other of the first and second separators is the second separator,
    the recessed portion supports and contacts the insulating member on a back side of the gasket of the at least one unit cell.

4. The fuel cell stack of claim 3, wherein
the unit cells include first and second unit cells,
the first unit cell is the at least one unit cell,
the second unit cell is the adjacent unit cell,
the second unit cell faces the second separator of the first unit cell on a side opposite to the first separator of the first unit cell,
the second separator of the first unit cell includes a pressing portion pressing the gasket of the second unit cell, and
the pressing portion protrudes toward the first separator of the first unit cell and contacts and supports the first and second protruding portions of the first unit cell.

5. The fuel cell stack of claim 1, wherein
the one of the first and second separators is the second separator,
the other of the first and second separators is the first separator,
the unit cells include first and second unit cells,
the first unit cell is the at least one unit cell,
the second unit cell is the adjacent unit cell,
the second unit cell faces the second separator of the first unit cell on a side opposite to the first separator of the first unit cell,
the second separator of the first unit cell includes a pressing portion pressing the gasket of the second unit cell, and
the pressing portion is recessed from the first and second protruding portions of the first unit cell to be away from the first separator of the first unit cell.

6. The fuel cell stack of claim 1, wherein
the fluid is the coolant, and
the flow path portion is defined between the first and second separators.

7. The fuel cell stack of claim 1, wherein
the fluid is the reactant gas,
the unit cells include first and second unit cells,
the first unit cell is the at least one unit cell,
the second unit cell is the adjacent unit cell,
the adjacent unit cell includes:
    an adjacent membrane electrode assembly; and
    an adjacent insulating member having a frame shape and joined at an outer peripheral edge of the adjacent membrane electrode assembly, and
the flow path portion of the first unit cell is defined between the second separator of the first unit cell, and the adjacent insulating member and the adjacent membrane electrode assembly of the adjacent unit cell adjacent to the second separator of the first unit cell on a side opposite to the first separator of the first unit cell.

8. The fuel cell stack of claim 1, wherein a length, of a portion of the first separator spaced apart from the insulating member on the back side of the gasket of the at least one unit cell, in a direction in which the gasket of the at least one unit cell extends, is less than 1 mm.

9. The fuel cell stack of claim 1, wherein the first separator contacts and supports the insulating member on the back side of the gasket of the at least one unit cell over an entire area of the gasket of the at least one unit cell.

* * * * *